/ / / / / / / US006641095B2

(12) United States Patent
Lindsay

(10) Patent No.: US 6,641,095 B2
(45) Date of Patent: Nov. 4, 2003

(54) CAMERA MOUNTING TRIPODS

(75) Inventor: Richard Arthur Lindsay, Suffolk (GB)

(73) Assignee: The Vitec Group, PLC, Suffolk (GB)

( * ) Notice: Subject to any disclaimer, the term of this patent is extended or adjusted under 35 U.S.C. 154(b) by 0 days.

(21) Appl. No.: 10/122,780

(22) Filed: Apr. 15, 2002

(65) Prior Publication Data

US 2002/0153460 A1 Oct. 24, 2002

(30) Foreign Application Priority Data

Apr. 20, 2001 (GB) .............................................. 0109770

(51) Int. Cl.$^7$ ................................................ F16M 11/38
(52) U.S. Cl. ...................................... 248/167; 396/419
(58) Field of Search .............................. 248/166, 167, 248/168, 169, 170, 171, 163.1; 396/419

(56) References Cited

U.S. PATENT DOCUMENTS 5,165,635 A * 11/1992 Hoshino ..................... 248/169
5,435,509 A * 7/1995 Bingham .................... 248/159
5,503,357 A * 4/1996 Johnson et al. ............. 248/169
6,347,773 B1 * 2/2002 Gross et al. ............. 144/286.1

FOREIGN PATENT DOCUMENTS

WO   WO 00/43709   * 7/2000

OTHER PUBLICATIONS

Copy of Brochure for "The Advanced Range of New Vision Systems . . . ", a Vinten tripod, published before Apr. 15, 2002.
Copy of photos from a Brochure for a Miller tripod, published before Apr. 15, 2002.

* cited by examiner

Primary Examiner—Ramon O. Ramirez
(74) Attorney, Agent, or Firm—Moser, Patterson & Sheridan, LLP

(57) ABSTRACT

The disclosure relates to a camera mounting tripod having a hub with three legs hinged at one end thereof to the hub at equi-spaced locations around the hub to swing between a folded condition in which the legs lie alongside one another and an erect position in which the legs diverge from one another. An automatic releasable latching device is provided on one of the legs to engage end housings on the other two legs to hold the legs in the folded position.

14 Claims, 5 Drawing Sheets

CAMERA MOUNTING TRIPODS

BACKGROUND TO THE INVENTION

1. Field of the Invention

This invention relates to portable camera mounting Tripods.

2. Background Prior Art

A typical camera mounting tripod comprises a hub having three legs hinged at one end thereof at equi-spaced positions around the hub to swing between a folded condition in which the legs lie alongside one another and an erect position in which the legs diverge from one another. It is usual to provide a means for holding the legs together in the folded conditions for transport and storage of the tripod. Typically some form of strap is provided. For example, an extendable strap nay be mounted on one of the legs which can be drawn out of the leg and secured around the legs to hold the legs in their folded condition. This usually requires the stand to be inverted or support horizontally whilst the strap is located in place and is inevitably a two-handed operation.

The object of the present invention is to provide a means for holding the legs of the tripod together in the folded condition which can be engaged with a minimum of effort required by the operator and similarly released with the minimum of effort.

SUMMARY OF THE INVENTION

This invention provides camera mounting tripod having a hub with three legs hinged at one end thereof to the hub at equi-spaced locations around the hub to swing between a folded condition in which the legs lie alongside one another and an erect position in which the legs diverge on one another and automatic releasable latching means on one of the legs to engage and hold the other two legs in the folded position.

In one arrangement according to the invention the latching means on said one leg may comprise a pair of latching devices mounted on the leg to engage with the other two legs respectively to hold the legs in the folded position, the latching devices engaging with said legs automatically when the legs ate swung into the folded condition.

Preferably release members are provided for the respective latching devices which are arranged to be operable single handed for release of the latches.

In any of the above arrangements in each latch device may comprise an arm having a pivot mounting on the leg, the arm having a latch adjacent one end thereof for engaging and holding another leg in the folded position and a release member at the other end of the arm to pivot the arm to release the latch from the other leg.

More specifically the arm maybe spring loaded about the pivot into the latching position.

In the latter arrangement a compression spring may act between the release member and leg to bias the arm into a latching position.

In a preferred arrangement the arms of the two latching devices may be located side by side one another on the leg with a bridging member linking the arm.

The latching devices may be mounted at the ends of the leg remote from the hub to which they are hinged.

In the case where the legs are telescopically extendable, the latching devices may be mounted adjacent the ends of the first members of the legs hinged to the hub.

DESCRIPTION OF THE PREFERRED EMBODIMENTS

Figure 1:
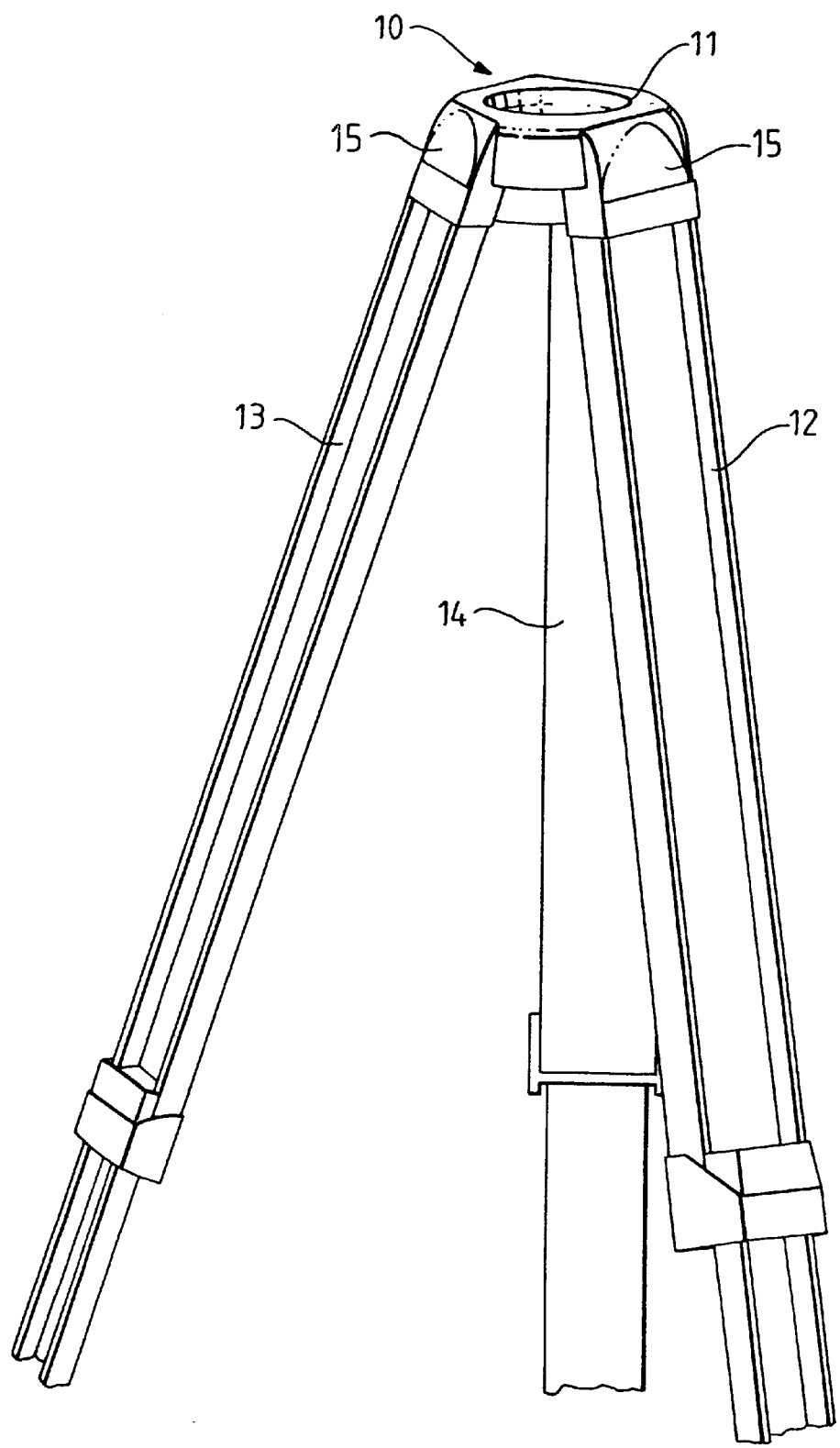
FIG. 1 illustrates an upper part of a portable camera mounting tripod having three extendable legs.
Figure 2:
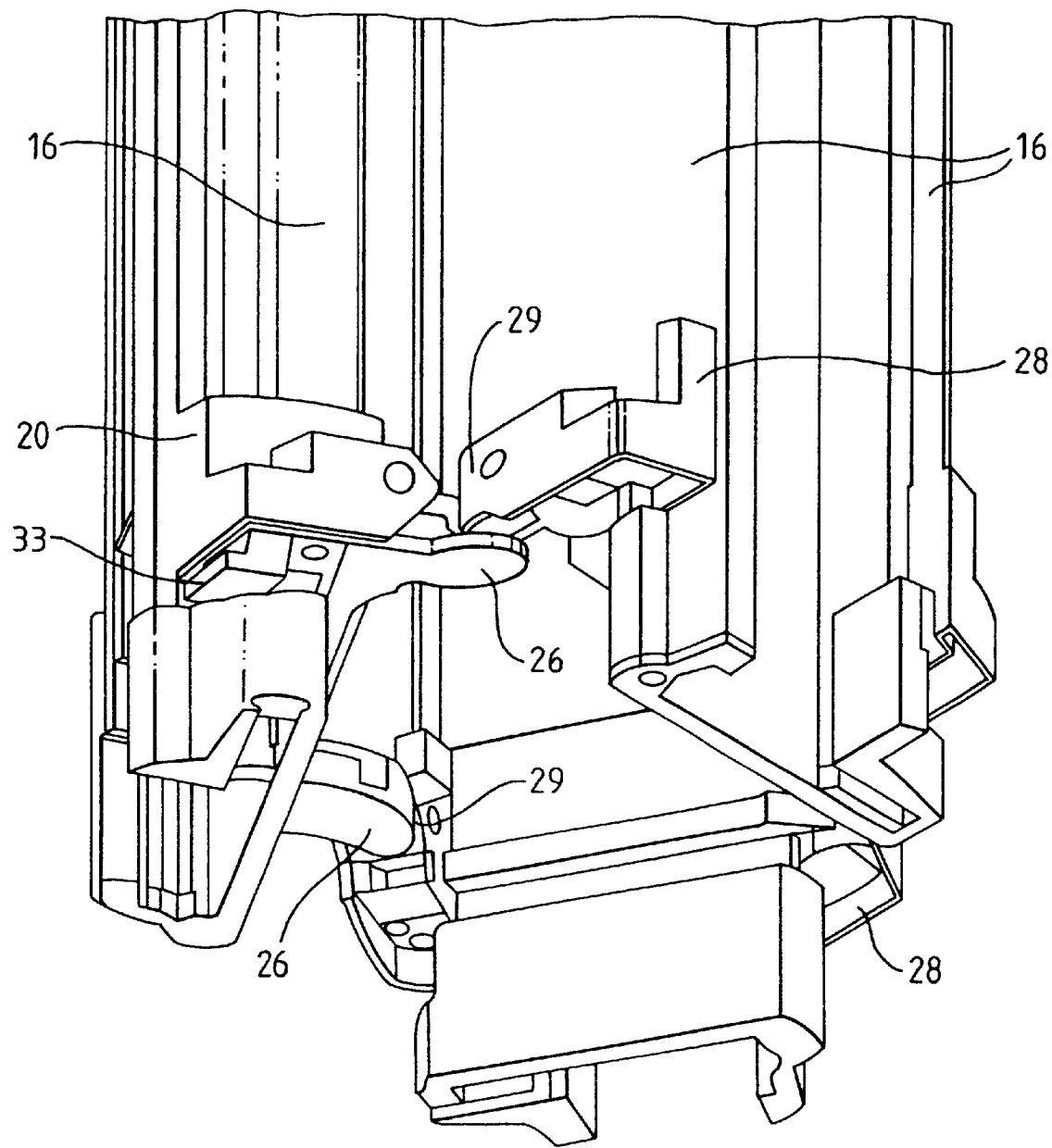
FIG. 2 is a perspective view of the lower ends of the first elements of the extendable legs showing latching devices on one of the legs engageable with the other two legs for holding the legs in a folded condition.
Figure 3:
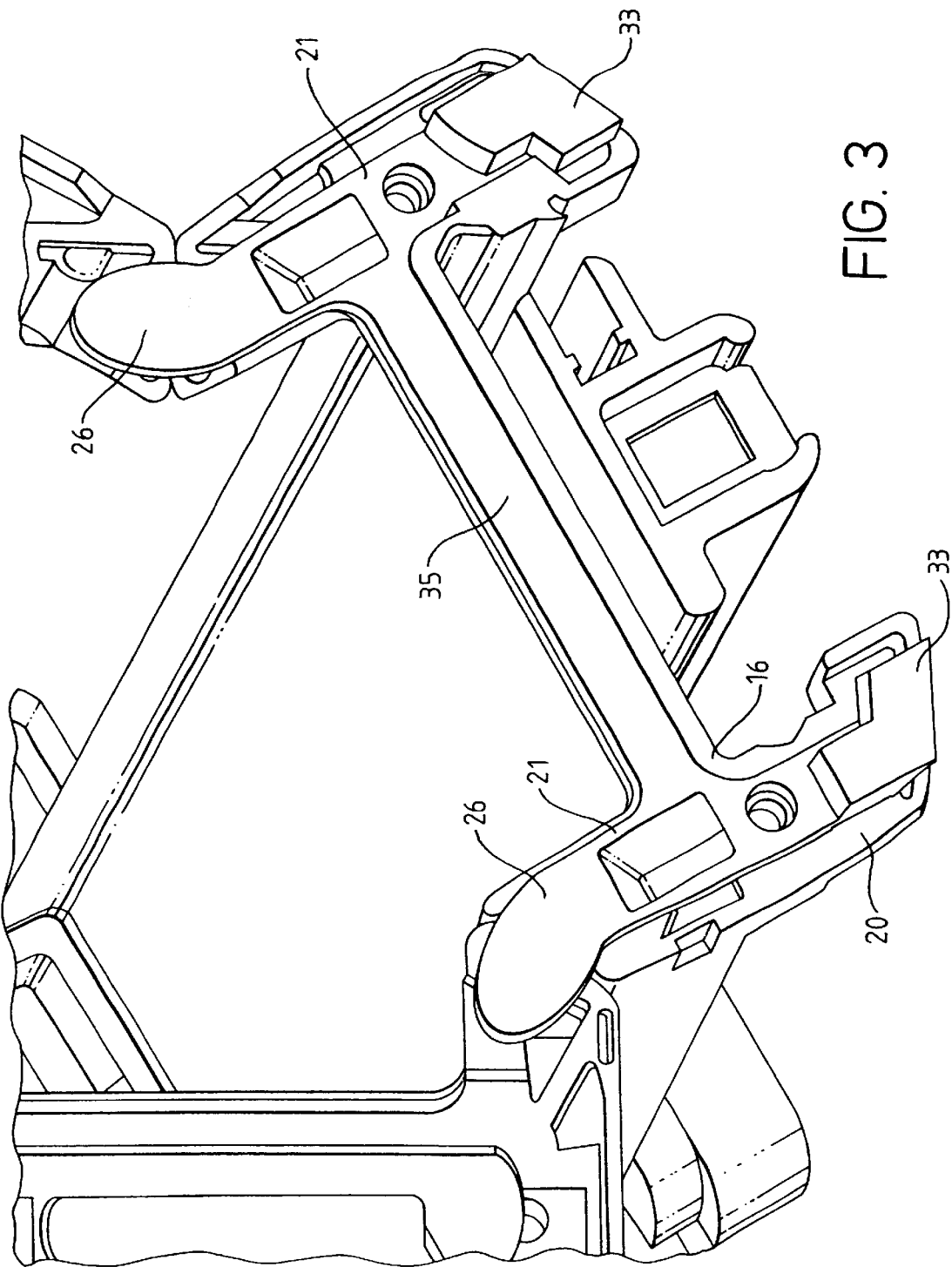
FIG. 3 is an underplan view of the ends of the tripod legs showing the engagement of the latching devices on one leg with the other two legs.

FIG. 1 of the drawing shows a portable tripod stand of the form described and illustrated in our International Patent Publication No. WO 00/43709 to which the present invention is applicable. The stand comprises a hub 10 having a socket 11 to receive the standard spherical ball of a camera mounting plate which is not shown. The hub has three telescopically extendable legs 12, 13 and 14 pivotally mounted as equi-spaced locations around the hub by pivotal mountings 15 at the upper ends of the legs to permit the legs to swing between a folded position in which they lie alongside one another for storage and transport and an extended position in which they diverge from one another to support the stand for use.

Each leg has three or more telescopically engaged leg members only two of which can be seen and adjustable locking devices (not shown) are provided for enabling the length of the legs to be adjusted to support the stand at the required height.

One of the upper leg members 16 has latching devices mounted at the lower end of the member to engage automatically and hold the leg members together in the folded condition which will now be described with references to FIGS. 2 to 6.

Figure 6:
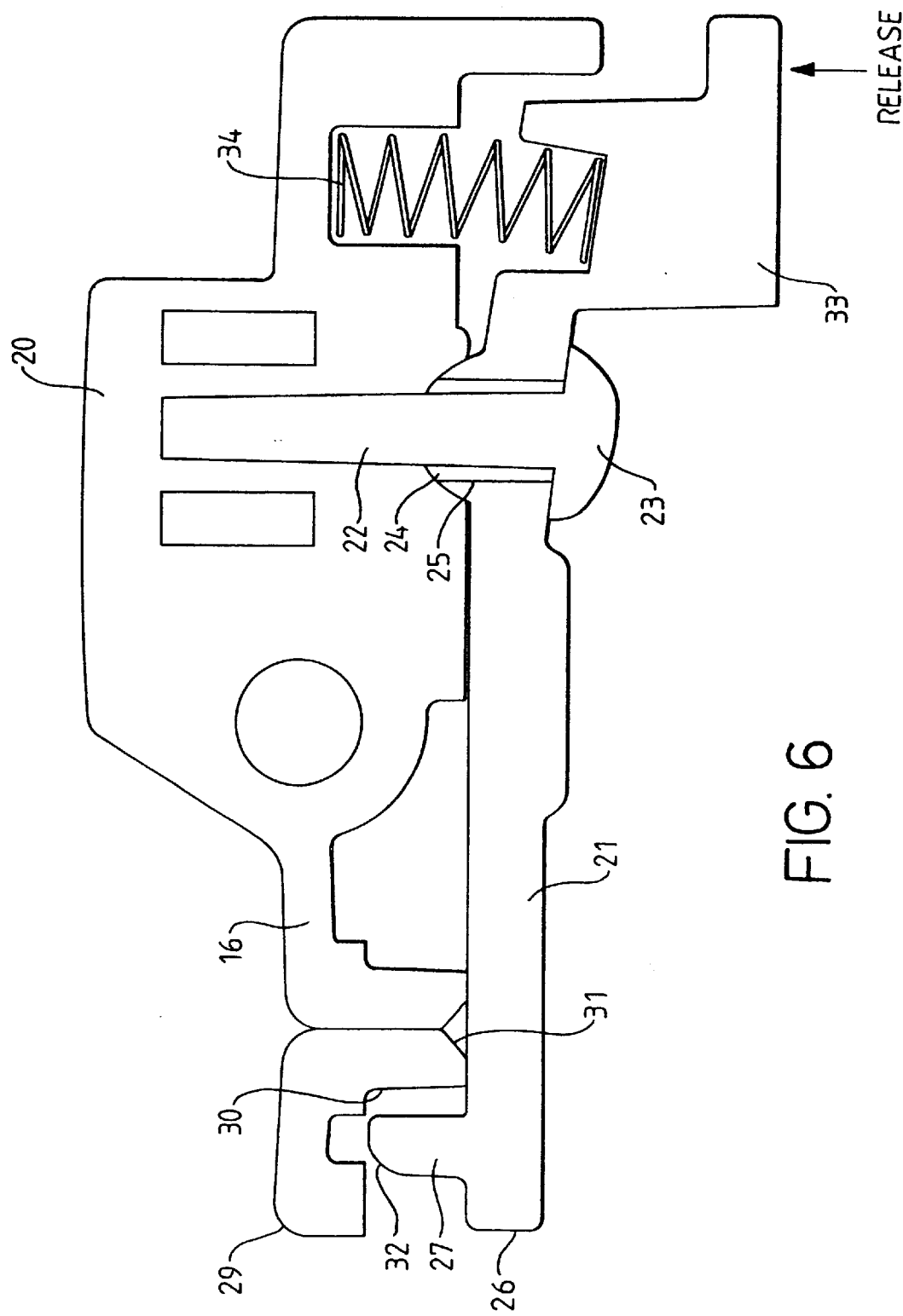
FIG. 6 is a scrap section view through a lower part of one leg showing a latching device mounted on the leg and engaging with part of another leg.

The leg member 16 on which the latching devices are mounts has towards the lower end of the leg member, a moulded housing 20 is mounted on the leg member in which the latching devices are supported. As best seen in FIG. 6, each latching device comprises an arm 21 supported by a pivot pin 22 on the housing. The arm is retained on the pivot pin by a head 23 of the pivot pin and there is a clearance 24 between the shank of the pivot pin 22 and the bore 25 in the arm which allows the arm to have limited tilting movement about the pivot pin with respect to the housing.

One end 26 of the arm projects outwardly of the housing and has an upstanding integral latch 27. Each of the other legs of the tripod also has a housing 28 secured adjacent its lower end, the moulding having a buffer portion 29 shaped to engage with the housing on the first leg and to provide recess indicated at 30 to receive the latch. The buffer portion has a chamber 31 on the face which first engages the latch and the latch has a corresponding chamber 32 to spring the latch downwardly as the legs of the tripod approach one another an the housings of the respective legs come together. The latch 27 on said one leg engages in the recess 30 in the housing in the other leg to hold the legs together.

The latch is released to enable the legs to be swung outwardly by an integral press button 33 on the lever at the other end of the lever from the latch. A compression spring 34 acts between the pressure member and housing to bias the latch into the engaged position.

Figure 4:
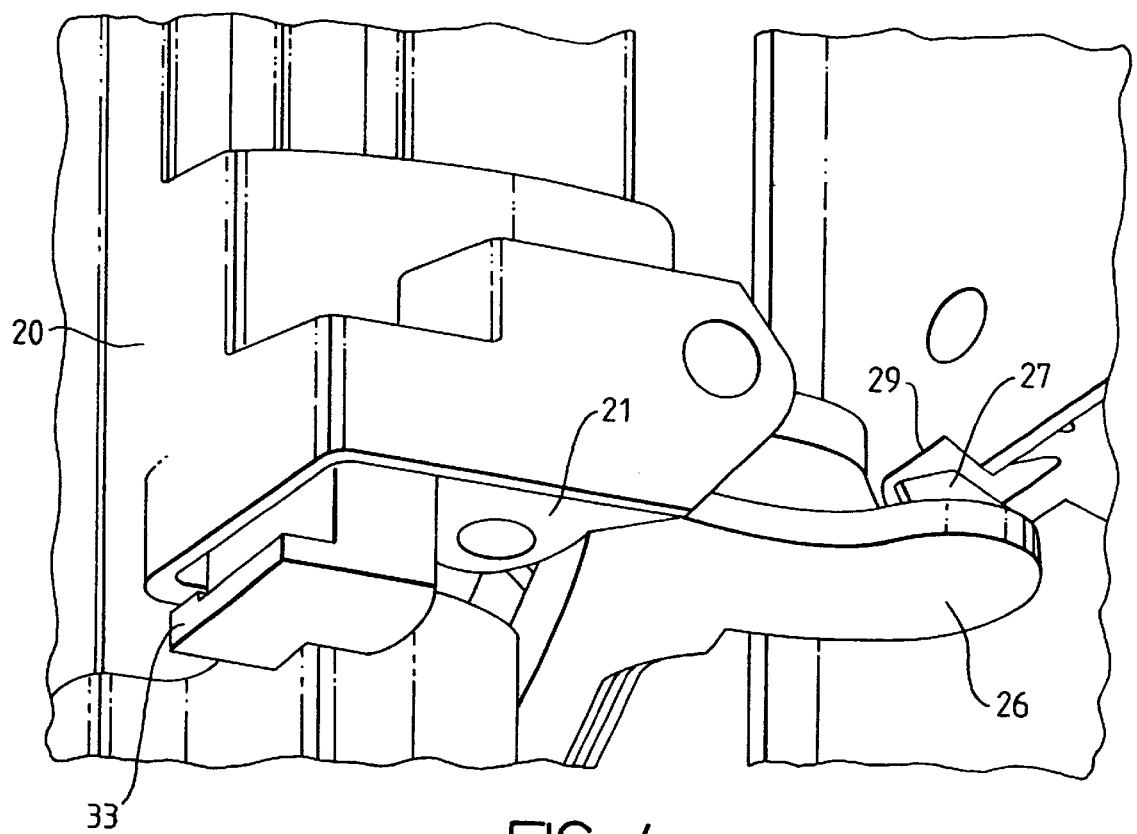
FIG. 4 is an enlarged view of one latching device on one of the legs showing the engagement of the device with another of the legs.
Figure 5:
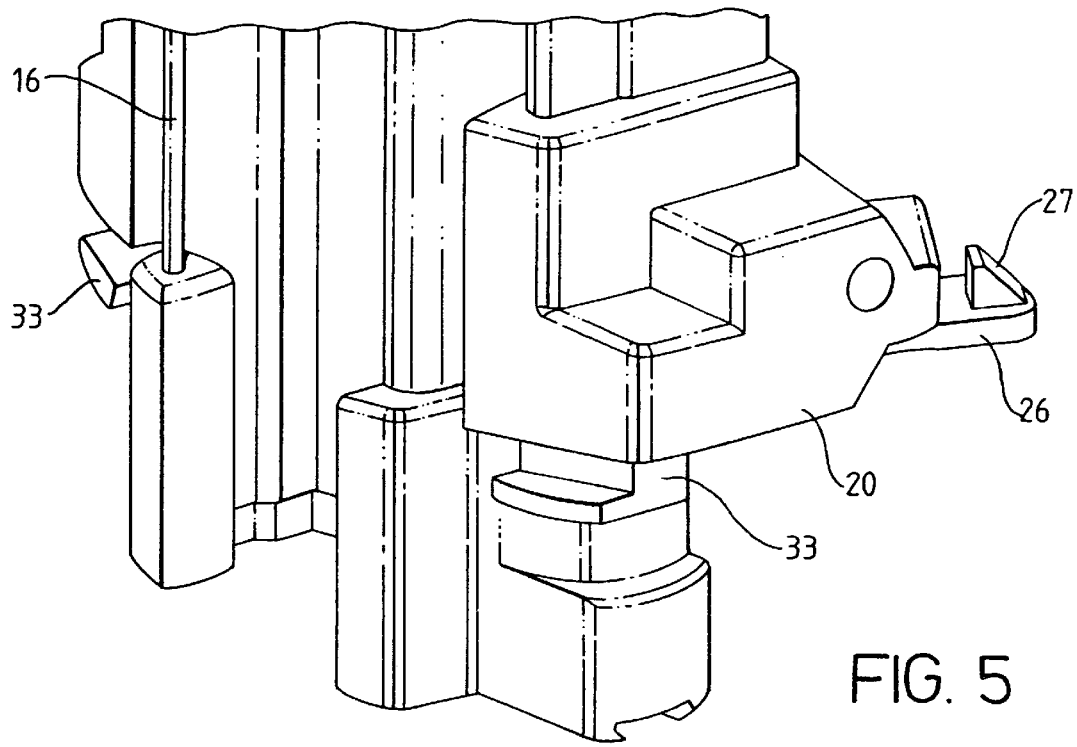
FIG. 5 is an enlarged view of a lower part of the leg carrying the latching devices.

The lower end of said one leg has two such latch devices at spaced locations across the leg for engaging the other legs of the tripod. The arms are linked by an integral cross member 35. FIGS. 4 and 5 show one of the latching devices at the lower end of the first leg in greater detail engaging the other leg in FIG. 4 and alone in FIG. 5.

The latching arrangement automatically engages when the legs of the tripod are folded together to provide a particularly convenient locking arrangement for the legs when the tripod is being collapsed following use. Equally the latching devices at the lower end of said one leg are readily released by the fingers of one hand by simply depressing the press members of the devices to allow the operator to release the legs to be swung outwardly the tripod is being erected for use.

What is claimed is:

1. A camera mounting tripod having a hub with three legs hinged at one end thereof to the hub at equi-spaced locations around the hub to swing between a folded condition in which the legs lie alongside one another and an erect position in which the legs diverge from one another, and automatic releasable latching means on one of the legs to engage and hold the other two legs in the folded position, wherein the latching means comprise a latching device mounted at an end of the one leg remote from the hub to which it is hinged and the latching device being engagable with the adjacent ends of the other two legs in the folded position.

2. A tripod as claimed in claim 1, wherein the latching means on said one leg comprise a pair of latching devices mounted on the leg to engage with the other two legs respectively to hold the legs in the folded position, the latching devices engaging with said legs automatically when the legs are swung into the folded condition.

3. A tripod as claimed in claim 2, wherein release members are provided for the respective latching devices which are arranged to be operable single handed for release of the latches.

4. A tripod as claimed in claim 1, wherein each latch device comprises an arm having a pivot mounting on the leg, the arm having a latch adjacent one end thereof for engaging and holding another leg in the folded position and a release member at the other end of the arm to pivot the arm to release the latch from the other leg.

5. A tripod as claimed in claim 4, wherein the arm is spring loaded about the pivot into the latching position.

6. A tripod as claimed in claim 5, wherein a compression spring acts between the release member and leg to bias the arm into the latching position.

7. A tripod as claimed in claim 5, wherein the arms of the two latching devices are located side by side one another on the leg with a bridging member linking the arms.

8. A tripod as claimed in claim 5, wherein the legs are telescopically extendable, each leg comprising a first member hinged at one end to the hub and having an opposite end from which at least one further member is telescopically extendable, wherein the first member of one of the legs has a pair of latching devices mounted adjacent the opposite end of the member for engagement with the opposite ends of the first members of the other legs.

9. A camera mounting tripod having a hub with three legs hinged at one end thereof to the hub at equi-spaced locations around the hub to swing between a folded condition in which the legs lie alongside one another and an erect position in which the legs diverge from one another, and automatic releasable latching means on one of the legs to engage and hold the other two legs in the folded position, wherein each latch device comprises an arm having a pivot mounting on the leg, the arm having a latch adjacent one end thereof for engaging and holding another leg in the folded position and a release member at the other end of the arm to pivot the arm to release the latch from the other leg.

10. A tripod as claimed in claim 9, wherein the arm is spring loaded about the pivot into the latching position.

11. A tripod as claimed in claim 10, wherein a compression spring acts between the release member and leg to bias the arm into the latching position.

12. A tripod as claimed in claim 10, wherein the arms of the two latching devices are located side by side one another on the leg with a bridging member linking the arms.

13. A tripod as claimed in claim 10, wherein the latching devices are mounted at the ends of the leg remote from the hub to which they are hinged.

14. A tripod as claimed in claim 13, the legs are telescopically extendable, wherein the latching devices are mounted adjacent the ends of the first members of the legs hinged to the hub.

* * * * *